(12) United States Patent  
Ha (10) Patent No.: US 7,872,690 B2  
(45) Date of Patent: Jan. 18, 2011

(54) APPARATUS AND METHOD FOR IMPROVING CHANNEL CHANGE SPEED IN DIGITAL BROADCASTING RECEPTION TERMINAL

(75) Inventor: Ji-Won Ha, Seoul (KR)

(73) Assignee: Samsung Electronics Co., Ltd (KR)

( * ) Notice: Subject to any disclaimer, the term of this patent is extended or adjusted under 35 U.S.C. 154(b) by 1118 days.

(21) Appl. No.: 11/588,579

(22) Filed: Oct. 27, 2006

(65) Prior Publication Data

US 2007/0195204 A1    Aug. 23, 2007

(30) Foreign Application Priority Data

Feb. 17, 2006    (KR) .................. 10-2006-0015560

(51) Int. Cl.
*H04N 5/50*    (2006.01)
*H04N 5/44*    (2006.01)

(52) U.S. Cl. ........................... 348/731; 348/725

(58) Field of Classification Search ............ 348/725, 348/731–733; 455/77, 179.1, 181.1, 182.3, 455/192.3; *H04N 5/44, 5/50*

See application file for complete search history.

(56) References Cited

U.S. PATENT DOCUMENTS 7,705,920 B2 * 4/2010 Lee et al. ................ 348/725

2004/0158874 A1 * 8/2004 Ono et al. ................ 348/731
2005/0174483 A1    8/2005 Ruckriem

FOREIGN PATENT DOCUMENTS

| EP | 1 286 351 | 2/2003 |
|---|---|---|
| EP | 1 389 874 | 2/2004 |
| EP | 1 684 450 | 7/2006 |
| JP | 57-147320 | 9/1982 |
| JP | 02-100409 | 4/1990 |
| KR | 1020040063381 | 7/2004 |
| WO | WO 2005/043784 | 5/2005 |

* cited by examiner

*Primary Examiner*—Sherrie Hsia
(74) *Attorney, Agent, or Firm*—The Farrell Law Firm, LLP (57) ABSTRACT

Disclosed are an apparatus and a method for decreasing a channel change time in a digital broadcasting reception terminal. Starting time information of at least one non-reference channel is selected. When the user selects a non-reference channel, broadcast data thereof is received by using the collected starting time information. The apparatus extracts time offset values between a starting time of a current reference channel and that of each at least one non-reference channel, and then obtains the starting time of each non-reference channel by using the extracted time offset values. When a channel change is performed, the starting time of the non-reference channel is established to receive broadcast data based on the starting time according to a corresponding time offset value. Hence, a time period required for a channel change is significantly reduced.

12 Claims, 5 Drawing Sheets

APPARATUS AND METHOD FOR IMPROVING CHANNEL CHANGE SPEED IN DIGITAL BROADCASTING RECEPTION TERMINAL

PRIORITY

This application claims the benefit under 35 U.S.C. 119(a) of an application entitled "Apparatus And Method For Improving Channel Change Speed In Digital Broadcasting Reception Terminal" filed in the Korean Intellectual Property Office on Feb. 17, 2006 and assigned Serial No. 2006-15560, the contents of which are incorporated herein by reference.

BACKGROUND OF THE INVENTION

1. Field of the Invention

The present invention relates generally to a digital broadcasting reception terminal, and more particularly to a digital broadcasting reception terminal for receiving digital broadcast data based on a digital video broadcasting-handled (DVB-H) scheme and a channel change method of the same.

2. Description of the Related Art

Digital broadcasting generally refers to a broadcasting service which provides users with a high-definition image and high-quality sound and improved service over conventional analog broadcasting. There are various types of digital broadcasting, including digital multimedia broadcasting (DMB), digital audio broadcasting (DAB), digital video broadcasting (DVB), MediaFLO, and digital video broadcasting-handled (DVB-H).

The DVB-H broadcasting system uses an Internet protocol data casting (IPDC) scheme, which broadcasts data including audio and video (AV) data after compressing the broadcast data in a packet unit, such as in the wire/wireless Internet. According to the DVB-H broadcasting scheme, the packetized broadcast data according to each channel are multiplexed in a time slicing multiplexing data transmission method. The time slicing multiplexing method slices the capacity of a transmission path into time slots (i.e., time intervals) which carry the packetized broadcast data.

Figure 1:
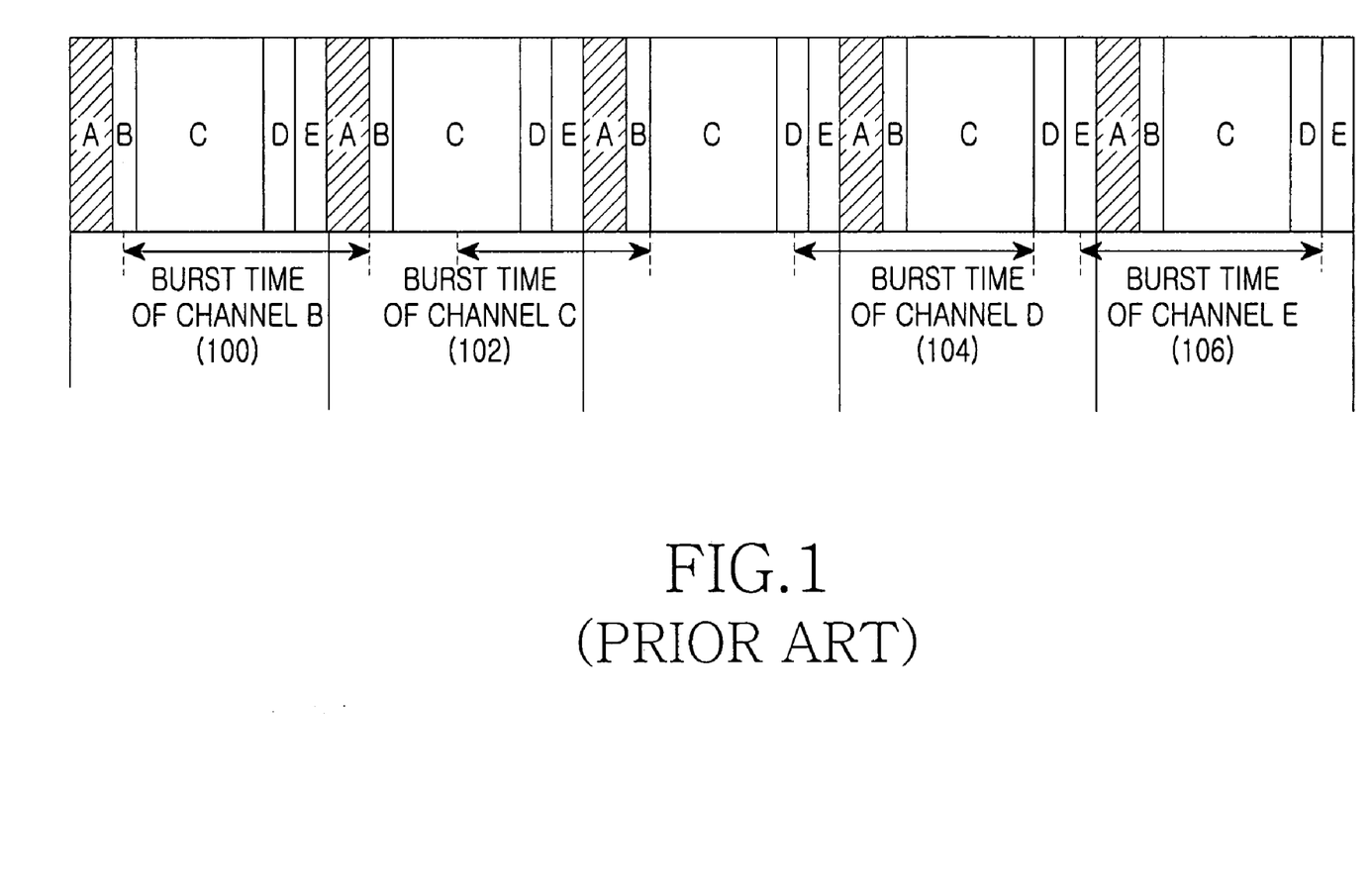
FIG. 1 is a view illustrating digital broadcast data broadcasted through a time slicing multiplexing method in a conventional DVB-H broadcasting system.

FIG. 1 is a view illustrating digital broadcast data broadcasted in a conventional DVB-H broadcasting system.

It is assumed in FIG. 1 that the DVB-H broadcasting system has five broadcasting channels, that is, channels A, B, C, D and E. In this case, a broadcasting station packetizes broadcast data according to channels, and periodically broadcasts resultant packet data according to a channel sequence. As a result, a broadcasting station in the DVB-H broadcasting system broadcasts data of each channel based on a period of time, as shown in FIG. 1. Then, a digital broadcasting reception terminal decodes information about a starting time when broadcast data of a channel selected by the user from among the entire broadcast data are broadcasted, and receives broadcast data at the starting time, thereby receiving a digital broadcast of only the channel selected by the user. Accordingly, the user can view the broadcast data of a desired channel.

However, according to the time slicing multiplexing method of the DVB-H broadcasting system, time slots for channels included in one period may have different sizes, as shown in FIG. 1. For example, referring to channels B and C, it is evident that the size of a time slot allocated to channel C is much larger than that allocated to channel B.

In the DVB-H broadcasting system, since the sizes of time slots are not uniform, as described above, it is impossible to transmit broadcast data in time synchronization between a broadcasting station and a digital broadcasting reception terminal. For this reason, broadcast data broadcasted through each time slot allocated to each channel in the DVB-H broadcasting system includes a time value of a starting point of a time slot of the corresponding channel in a next period, that is, a time value of a starting time point at which broadcast data of the corresponding channel is broadcasted in the next period. By using the time value, a digital broadcasting reception terminal can then recognize the starting time point at which reception of broadcast data of the corresponding channel starts in the next period. Accordingly, the digital broadcasting reception terminal can receive broadcast data of only a channel selected by the user, by resuming reception of broadcast data at the starting time point in the next period. A burst time of each channel, shown in FIG. 1, represents the time value for notifying the digital broadcasting reception terminal of the starting time point of each channel.

When the user desires to change a channel in the DVB-H broadcasting system, the digital broadcasting reception terminal must have information about a time when reception of broadcast data of a channel desired by the user is to begin. Therefore, according to the conventional DVB-H broadcasting system, when the user selects a channel change, the digital broadcasting reception terminal receives a part of packet data of a channel different from a currently-set channel according to a sequence of channels, and extracts a time value "delta_T" of a channel selected by the user. When the time value has been extracted, the digital broadcasting reception terminal consecutively discounts the time value, and resumes reception of broadcast data when the time value has elapsed, i.e., at the time point corresponding to the time value, so that the digital broadcasting reception terminal can receive packet data of only the channel selected by the user according to each period. Hereinafter, such a time value will be referred to as "starting time point information".

When the user selects a channel change, the digital broadcasting reception terminal receives packet data of a channel following a currently-set channel. Then, the digital broadcasting reception terminal checks whether the received packet data corresponds to packet data of a channel selected by the user. When the received packet data corresponds to packet data of a channel selected by the user, the digital broadcasting reception terminal receives the packet data of the corresponding channel and extracts starting time point information about a starting time point for reception of broadcast data of the corresponding channel. The digital broadcasting reception terminal receives packet data of the corresponding channel according to the extracted starting time point information in the next broadcasting period.

However, in FIG. 1, when the user selects a channel change to channel A while viewing channel B, the conventional digital broadcasting reception terminal must continuously receive broadcasts of all channels until receiving the channel A in the next period via channels C, D and E. Therefore, the conventional digital broadcasting reception terminal in the DVB-H broadcasting system requires too much time for change of a channel and incurs unnecessary power consumption.

SUMMARY OF THE INVENTION

Accordingly, the present invention has been made to solve the above-mentioned problems occurring in the prior art, and an object of the present invention is to provide an apparatus and a method for increasing a channel change speed in a DVB-H broadcasting system.

To accomplish this object, in accordance with the present invention, there is provided an apparatus for improving a channel change speed in a digital broadcasting reception terminal, including a digital broadcast receiving unit for receiving, from the received broadcast data, broadcast data through a preset reference channel and at least one non-reference channel different from the reference channel, and extracting starting time point information about a starting time for reception of broadcast data of each corresponding channel, a timer for extracting, for the respective non-reference channels, a time interval from a reception time point of broadcast data of the reference channel to a starting time for reception of broadcast data of a corresponding non-reference channel, and a controller for controlling the digital broadcast receiving unit to extract starting time point information of the reference channel and the non-reference channels, receiving broadcast data of each channel according to the starting time point information of the reference channel and the starting time point information of the respective non-reference channels, and storing time intervals extracted by the timer as time offset values of the respective corresponding non-reference channels.

In accordance with the present invention, there is also provided a method for improving a channel change speed in a digital broadcasting reception terminal which receives digital broadcast data based on a DVB-H scheme, including setting a channel selected by a user as a reference channel, and extracting, from broadcast data received through the reference channel, reference-channel starting time point information about a starting time for reception of broadcast data of the reference channel, extracting non-reference channel starting time point information from each of non-reference channels, which information includes a starting time for reception of broadcast data of each of the non-reference channels, the non-reference channels being different from the reference channel, and then extracting time offset values for the respective non-reference channels, which represent time intervals from the reference-channel starting time point to the respective time points according to the extracted non-reference channel starting time point information, determining whether the user has performed a channel change, extracting starting time point information of a channel selected through the channel change by using the reference-channel starting time point information and a time offset value of the selected channel when the user has performed the channel change, and receiving broadcast data according to the starting time point information of the selected channel, and setting the selected channel as the reference channel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. It is to be noted that the same elements are indicated with the same reference numerals throughout the drawings. In the following description of the embodiment of the present invention, a detailed description of known functions and configurations incorporated herein will be omitted for the sake of clarity and conciseness.

According to the present invention, a digital broadcasting reception terminal in a DVB-H broadcasting system collects starting time point information of channels (hereinafter non-reference channels), other than a channel selected by the user, in sequence on the basis of the channel selected by the user. Thereafter, when the user selects a non-reference channel, the digital broadcasting reception terminal controls broadcast data of the channel newly-selected by the user to be received by using the collected starting time point information of the non-reference channels. To this end, the digital broadcasting reception terminal according to the present invention extracts time offset values, each of which is an offset value between a starting time point of a current reference channel and a starting time point of each of the non-reference channels, and then obtains the starting time point of each non-reference channel by using the extracted time offset values. After performing a channel change, the digital broadcasting reception terminal controls broadcast data to be received according to a starting time point based on the time offset value of the newly-selected channel. Therefore, the present invention can significantly reduce the time required for a channel change when the user performs a channel change in the DVB-H broadcasting system.

Figure 2:
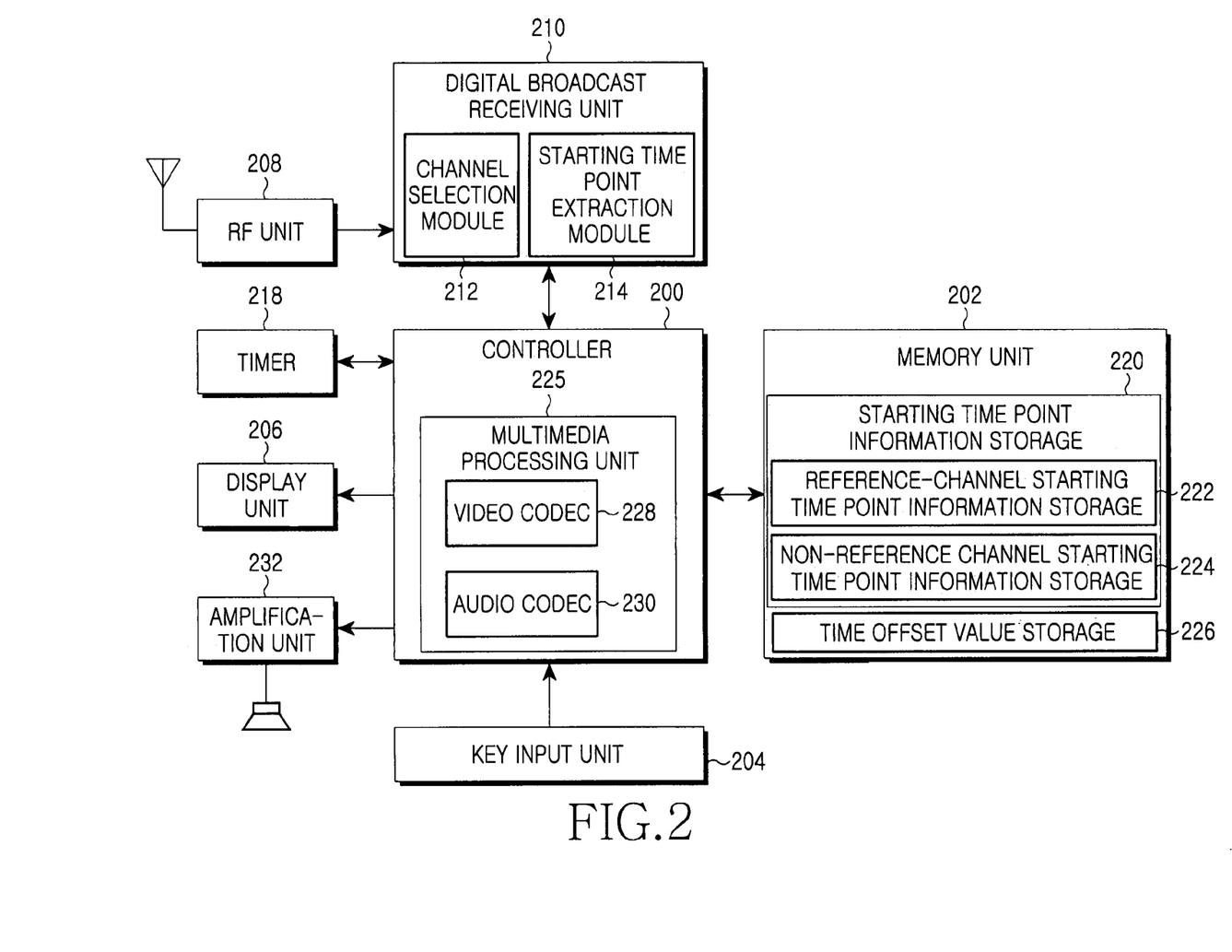
FIG. 2 is a block diagram illustrating the construction of a digital broadcasting reception terminal in a DVB-H broadcasting system according to the present invention.

FIG. 2 is a block diagram illustrating the construction of a digital broadcasting reception terminal according to the present invention.

The digital broadcasting reception terminal includes a memory unit 202, a key input unit 204, a display unit 206, an amplification unit 232, a timer 218, a digital broadcast receiving unit 210 and a controller 200 connected to each of the components. The controller 200 processes voice signals and data according to a protocol for wireless Internet access and digital broadcasting, and controls each component of the digital broadcasting reception terminal.

When reception of digital broadcast data starts, the controller 200 controls broadcast data of both a channel selected by the user and n on-reference channels different from the selected channel to be received. Starting time point information of the channel selected by the user is extracted and stored as the starting time point information of a reference channel. In addition, the starting time point information of the non-reference channels is extracted by using the broadcast data received through the non-reference channels and is stored as the starting time point information of the respective non-reference channels.

The controller 200 starts reception of broadcast data of the reference channel from a starting time point for reception of the broadcast data of the reference channel, according to the starting time point information of the reference channel. Then, the controller 200 drives the timer 218, selects one of the non-reference channels according to a sequence, and obtains a time interval until reception of broadcast data of the selected channel starts according to the starting time point information of the selected channel. The controller 200 stores the obtained time interval as a time offset value of the corresponding channel.

The controller 200 then determines whether the user has performed a channel change. When it is determined that the user has performed a channel change, the controller 200 sets a channel newly-selected by the user as a reference channel, and a time offset value of the newly-selected channel is stored as starting time point information of the reference channel. Accordingly, the digital broadcast receiving unit 210 sets the starting time point information of the channel newly-selected by the user as the starting time point information of the reference channel, so that the digital broadcast receiving unit 210 receives broadcast data of the reference channel newly-selected by the user, instead of broadcast data of the previous reference channel. As the reference channel has been changed as described above, the controller 200 updates time offset values of non-reference channels different from the newly-set reference channel.

Next, the controller 200 receives broadcast data of the newly-selected channel from the digital broadcast receiving unit 210, and sends the received broadcast data to the multimedia processing unit 225. The multimedia processing unit 225 sends the received broadcast data to a video codec 228 and an audib codec 230 according to the type of received broadcast data so that the broadcast data can be decoded. Next, the controller 200 controls the decoded broadcast data to be output through the display unit 206 and the amplification unit 232. As a result, the time period required for a user to perform a channel change is significantly reduced.

The memory unit 202 connected to the controller 200 includes a storage area for storing the starting time point information of the reference channel and of the non-reference channels. The memory unit 202 includes a storage area for storing time offset values, which represent time intervals from the starting time point of the reference channel to each starting time point of the respective non-reference channels. Hereinafter, the storage area of the memory unit 202 for storing the starting time point information of the reference channel will be referred to as a "reference-channel starting time point information storage 222", and the storage area of the memory unit 202 for storing the starting time point information of the non-reference channels will be referred to as a "non-reference channel starting time point information storage 224". Also, the storage area for storing time offset values for the respective non-reference channels will be referred to as a "time offset value storage 226".

The memory unit includes a read only memory (ROM), a flash memory and a random access memory (RAM). The ROM stores various reference data and programs for processing and controlling the operations of the controller 200. In addition, the RAM provides a working memory for the controller 200, and the flash memory provides an area for storing various updatable data for custody.

The key input unit 204 includes various keys including numeric keys to provide the controller 200 with key signals input by the user. The display unit 206 and amplification unit 232, which are connected to the controller 200, output video and audio signals applied from the controller 200, according to the control of the controller 200.

The RF unit 208 receives RF signals broadcasted from broadcasting stations. The digital broadcast receiving unit 210 includes a channel selection module 212 and a starting time point extraction module 214 so as to receive an RF signal input from the RF unit 208 according to starting time point information applied from the controller 200 and to convert the received RF signal into baseband digital data. Then, the digital broadcast receiving unit 210 applies the converted baseband digital data, as broadcast data of a channel selected by the user, to the controller 200. In addition to the channel selected by the user, broadcast data of at least one non-reference channel selected by the controller 200 is received, and starting time point information of the at least one non-reference channel is extracted from the received broadcast data. The extracted starting time point information is applied to the controller 200. When the digital broadcasting system is a DVB-H broadcasting system, the digital broadcast receiving unit 210 may be implemented with a DVB-H OFDM (Orthogonal Frequency Division Multiplexing) demodulator, which demodulates a signal received from a broadcasting station broadcasting DVB-H broadcast data based on an OFDM scheme so as to output digital broadcast data of a channel selected by the user.

Figure 3:
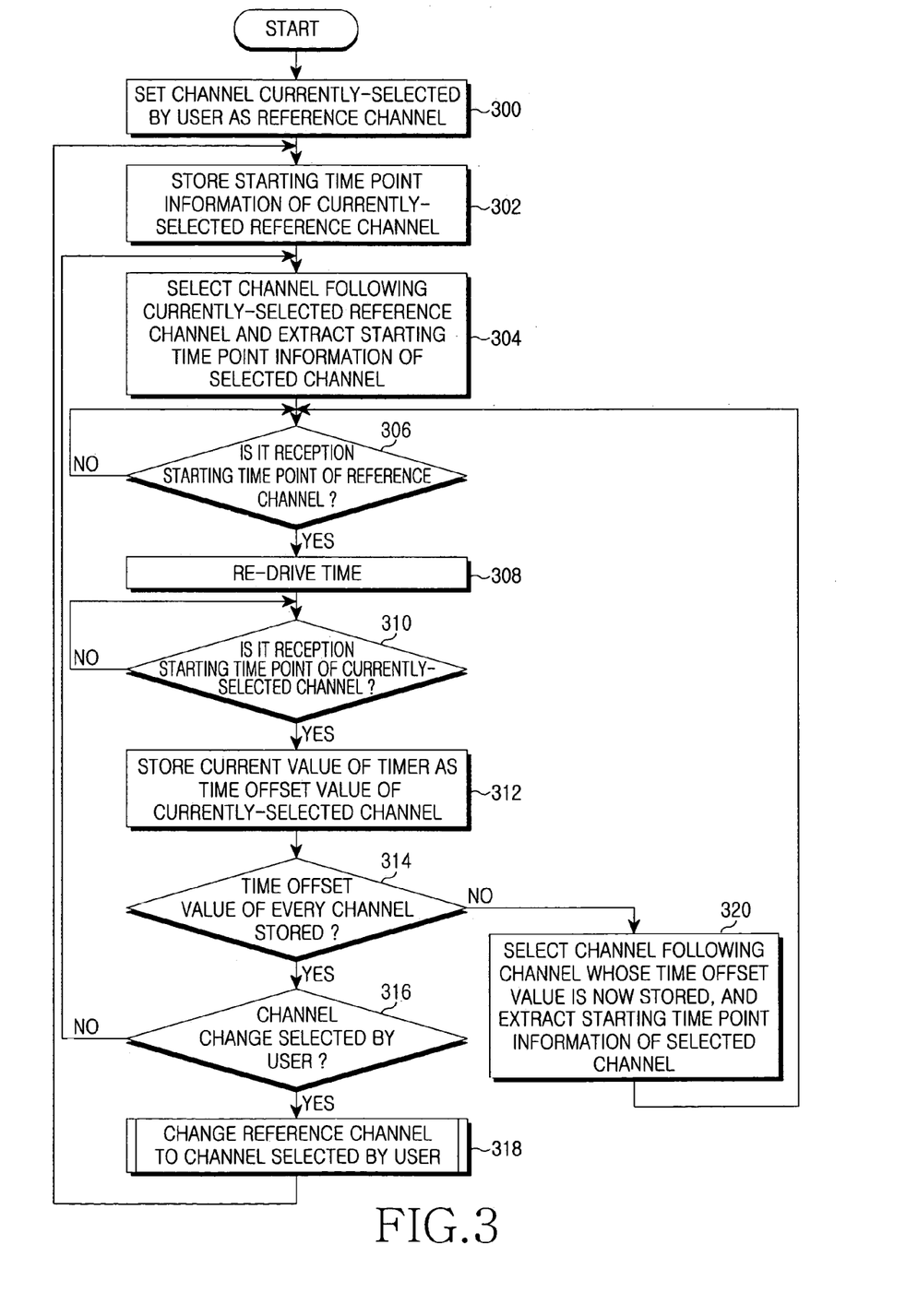
FIG. 3 is a flowchart illustrating a procedure for storing starting time point information of DVB-H broadcasting channels in the digital broadcasting reception terminal according to the present invention.

FIG. 3 is a flowchart illustrating a procedure for storing starting time point information of DVB-H broadcasting channels in the digital broadcasting reception terminal according to the present invention.

When reception of broadcast data has started, the digital broadcasting reception terminal sets a channel currently-selected by the user as a reference channel (step 300). In step 302, the digital broadcasting reception terminal receives broadcast data of the currently-selected reference channel from among the entire received broadcast data, extracts starting time point information from the broadcast data of the reference channel, and stores the starting time point information in the reference-channel starting time point information storage 222. In step 304, the controller 200 selects a non-reference channel following the currently-selected reference channel based on a preset sequence of channels, receives broadcast data of the selected non-reference channel, and extracts starting time point information for the selected non-reference channel. The controller 200 stores the extracted starting time point information in the non-reference channel starting time point information storage 224.

In step 306, the controller 200 determines whether a current time point corresponds to a reception starting time point based on the starting time point information of the reference channel. When it does, the controller 200 drives the timer 218 (step 308). In step 310, the controller 200 determines whether a current time point corresponds to a reception starting time point for the broadcast data of the selected non-reference channel. When it does, the controller 200 stores a time interval determined by the timer 218 as a time offset value of the currently-selected non-reference channel in the time offset value storage 226 (step 312).

In step 314, the controller 200 determines whether time offset values of all non-reference channels broadcasted during one period have been stored in the time offset value storage 226. When it is determined that the values have been stored, the controller 200 selects another non-reference channel for which a time offset value has been stored, based on a preset sequence of channels, and extracts starting time point information about a starting time for reception of broadcast data of the another non-reference channel, from the broadcast data received through the another non-reference channel (step 320). Then, the controller 200 stores the extracted information as the starting time point information of the another non-reference channel. The controller 200 returns to step 306 and determines whether a current time point corresponds to a reception starting time for reception of broadcast data of the reference channel. The controller 200 repeats steps 308 to 314 according to a result of step 306 until it is determined in step 314 that time offset values of all non-reference channels broadcasted during one period have been stored.

When it is determined that the values have been stored, the controller 200 determines whether the user has selected a non-reference channel (step 316). When it is determined that the user has not selected a non-reference channel, the controller 200 returns to step 304 so as to repeat steps 304 to 314, thereby updating time offset values of the non-reference channels. Herein, the controller 200 repeatedly updates time offset values of all the non-reference channels even though the time offset values of all the non-reference channels have already been stored, since the sizes of time slots for broadcast data broadcasted during one period may be changed in the case of the DVB-H broadcasting system. Therefore, according to the present invention, even after the time offset values of all the non-reference channels have been stored, the controller continuously updates the time offset values so as to store the latest information, so that an exact channel change can take place even when the sizes of the time slots have been changed.

When it is determined in step 316 that the user has selected a non-reference channel, the controller 200 performs a channel change to the non-reference channel newly-selected by the user, and sets the non-reference channel selected through the channel change as a new reference channel (step 318). When it is determined that the user has selected a channel change, the controller 200 extracts starting time point information of a non-reference channel selected by the user, by using the time offset value of the non-reference channel and the starting time point information of a current reference channel, and sets the extracted starting time point information of the non-reference channel in the digital broadcast receiving unit 210. In addition, the controller 200 newly sets the non-reference channel selected by the user as a new reference channel. The digital broadcast receiving unit 210 receives broadcast data according to the starting time point information based on the time offset value. Therefore, the present invention does require extracting starting time point information from broadcast data of a channel selected by the user after having received the broadcast data, or selecting again new starting time point information using the extracted starting time point information, so that the time required for a channel change can be significantly reduced. A procedure for performing a channel change to a channel selected by the user based on step 318 will be described in detail below with reference to FIG. 4.

When the channel selected by the user has been set as a reference channel in step 318, the controller 200 returns to step 302 in which the controller 200 stores the starting time point information of the newly-selected reference channel in the reference-channel starting time point information storage 222. Thereafter, the controller 200 repeats steps 304 to 316, thereby updating time offset values of non-reference channels based on the newly-selected reference channel.

Figure 4:
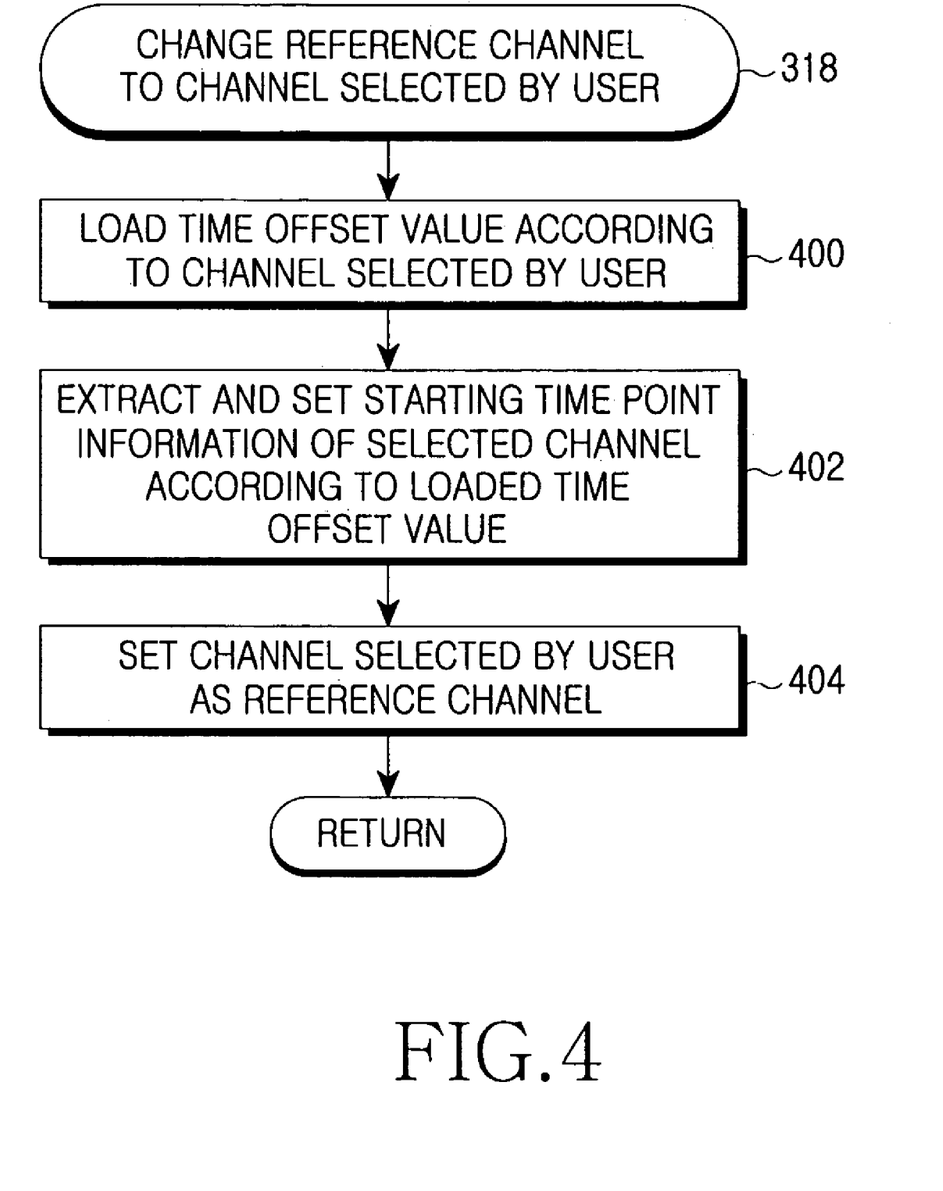
FIG. 4 is a flowchart illustrating a procedure for changing a reference channel in the digital broadcasting reception terminal when the user performs a channel change according to the present invention.

FIG. 4 is a flowchart illustrating a procedure for changing a reference channel in the digital broadcasting reception terminal when the user performs a channel change according to the present invention.

When it is determined in step 316 that the user has selected a channel change, the controller 200 loads a time offset value of a channel selected by the user (step 400). In step 402, the controller 200 extracts starting time point information of the selected channel, by using the loaded time offset value and the starting time point based on the starting time point information of the currently-set reference channel. The controller 200 sets the extracted starting time point information as starting time point information of a newly-set reference channel in the digital broadcast receiving unit 210. Thereafter, as described above, the channel selection module 212 of the digital broadcast receiving unit 210 receives broadcast data according to the set starting time point information, which represents a time interval from the starting time point of the current reference channel to that of the channel selected through the channel change. Therefore, the channel selection module 212 begins receiving broadcast data after a time period corresponding to the time offset value has elapsed from the starting time point of the existing reference channel. As a result, the channel selection module 212 can receive broadcast data of the channel newly-selected through the channel change of the user. Then, the controller 200 receives the broadcast data of the selected channel from the digital broadcast receiving unit 210, and decodes and outputs the received broadcast data.

In step 404, the controller 200 sets the channel newly-selected by the user as a reference channel. Thereafter, the controller 200 returns to step 302 of FIG. 3, in which the controller 200 extracts starting time point information from the received broadcast data, and stores the extracted starting time point information as the starting time point information of the changed reference channel. Then, as described above, the controller 200 repeats steps 304 to 306 of FIG. 3, in which the controller 200 updates time offset values of non-reference channels based on the newly-selected reference channel.

Figure 5A:
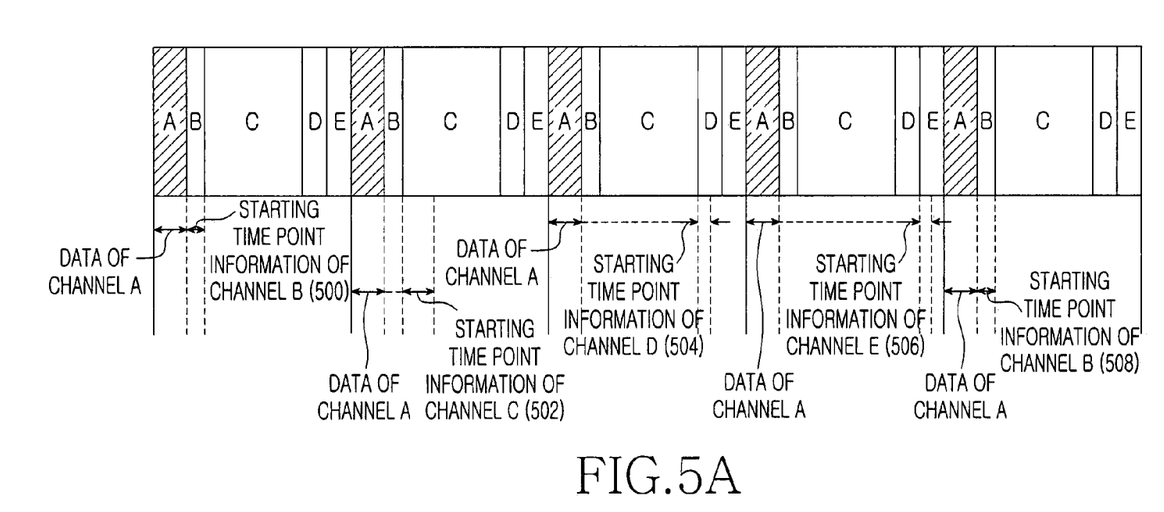
FIGS. 5A and 5B are examples of time offset values according to channels, which are stored in the digital broadcasting reception terminal according to the present invention.
Figure 5B:
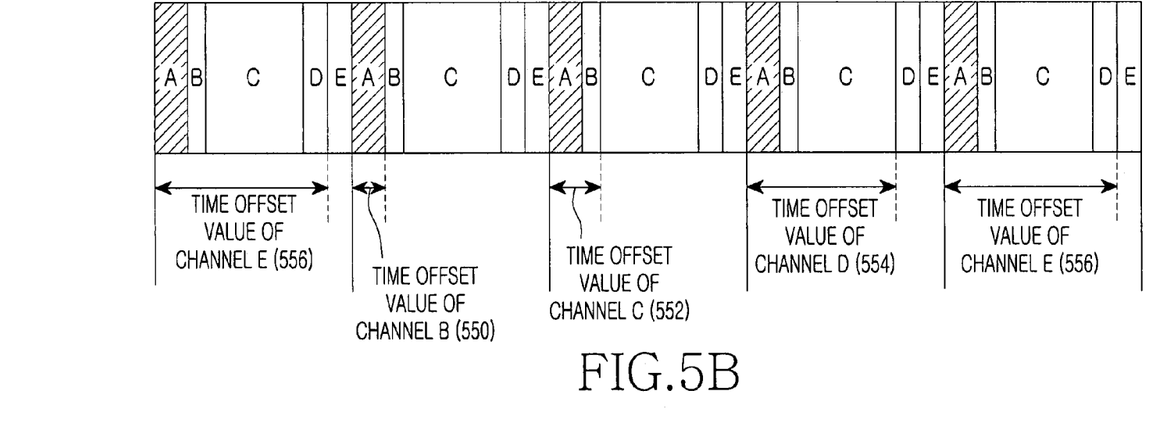

FIGS. 5A and 5B are examples of time offset values according to channels, which are stored in the digital broadcasting reception terminal according to the present invention.

In FIG 5A, the controller 200 extracts starting time point information of non-reference channels according to a preset sequence of channels on the basis of channel A, which has been set as a reference channel. In FIG. 5B, the controller 200 extracts time offset values of the respective non-reference channels by using the timer 218 when the starting time point information of the respective non-reference channels has been extracted as described in FIG. 5A.

When channel A has been set as a current reference channel, the controller 200 receives broadcast data of channel A during a first period. When the digital broadcasting reception terminal has received broadcast data of channel B, according to a preset sequence of channels while continuously receiving broadcast data, the digital broadcasting reception terminal extracts starting time point information 500 of channel B from the broadcast data of channel B. If the starting time point information 500 of the channel B can be extracted although only a part of the broadcast data of channel B has been received, the digital broadcasting reception terminal may receive only a part of the broadcast data of channel B, as shown in FIG. 5A. Generally, information about a starting time for reception of broadcast data of a corresponding channel is positioned in the header of broadcast data transmitted through the corresponding channel in the DVB-H broadcasting system. Therefore, in FIG. 5A, although the digital broadcasting reception terminal receives only the header portion of the broadcast data of channel B, instead of receiving all the broadcast data of channel B, there is sufficient data to extract the starting time point information of channel B. Although all broadcast data of channel B has not been received the controller 200 can recognize a starting time for reception of the broadcast data of channel B.

The controller 200 continuously receives broadcast data during a next period and extracts starting time point information 502 for channel C, which follows channel B according to a preset sequence of channels. Since the starting time point information of channel B is already known, the controller 200 does not consider broadcast data of channel B and determines whether broadcast data of channel C has been received. When broadcast data of channel C has been received, the starting time point information 502 for channel C is extracted from the received broadcast data. Then, starting time point information 504 and 506 for channels D and E are sequentially extracted in the aforementioned manner. When the starting time point information for all non-reference channels has been extracted, starting time point information of the non-reference channels is again extracted according to a preset sequence so as to be updated. Hence, starting time point information of non-reference channels different from the reference channel A are extracted on a one by one basis according to a preset sequence.

Meanwhile, as starting time point information for the respective non-reference channels has been extracted as shown in FIG. 5A, the controller 200 computes time offset values, which represent time intervals from the starting time point of a current reference channel to each starting time for reception of broadcast data of the respective non-reference channels, as shown in FIG. 5B. Herein, the time offset values are obtained by using the timer 218, as described above. That is, the controller 200 drives the timer 218 at a starting time for reception of broadcast data of reference channel A. Thereafter, when a current time point corresponds to the starting time point of channel B based on the starting time point information 500 of channel B, which has been obtained in FIG. 5A, the controller 200 stores a present value of the timer 218 as a time offset value 550 of channel B. Therefore, the time offset value of channel B represents a time interval from the reception starting time point of the reference channel (i.e. channel A) to the reception starting time point of channel B.

Next, the controller 200 drives the timer 218 at a starting time for reception of broadcast data of the reference channel A. Then, the controller 200 selects channel C, for which a time offset value has been stored, according to the preset sequence, and determines whether a current time point corresponds to a starting time for reception of broadcast data of channel C. When the current time point corresponds to the starting time for reception of broadcast data of channel C, the controller 200 stores a present value of the timer 218 as a time offset value 552 of channel C. Therefore, the time offset value of channel C corresponds to a time interval from the reception starting time of channel A to the reception starting time of broadcast data of channel C. Then, time offset values 554 and 556 of channels D and E are extracted in a manner similar to the foregoing process. In addition, time offset values of the non-reference channels are repeatedly extracted as shown in FIG. 5A and are continuously updated.

Therefore, according to the present invention, when the user performs a channel change from a currently-set channel to a non-reference channel, the controller 200 can obtain information of a starting time for reception of broadcast data of the non-reference channel, by using starting time point information of the currently-set reference channel and a time offset value of the non-reference channel selected by the user, even without extracting broadcast data of the selected non-reference channel. Accordingly, since starting time point information of a channel selected through a channel change can be established in the digital broadcast receiving unit 210 as soon as the user performs the channel change, a channel change can be rapidly completed without a long time delay.

Thus, the time period required for performing a channel change to a channel selected by the user in the digital broadcasting reception terminal which receives digital broadcast data of a DVB-H broadcasting scheme is significantly reduced.

While the present invention has been shown and described with reference to certain preferred embodiments thereof, it will be understood by those skilled in the art that various changes in form and details may be made therein without departing from the spirit and scope of the invention as defined by the appended claims. Particularly, the present invention can be applied to a case in which two or more non-reference channels are selected so as to extract starting time point information of the selected non-reference channels, when it is possible to check time offset values of the respective selected non-reference channels by using the timer of the digital broadcasting reception terminal. Accordingly, the scope of the invention is not to be limited by the above embodiments but by the claims and the equivalents thereof.

What is claimed is:

1. An apparatus for decreasing a channel change time in a digital broadcasting reception terminal, the apparatus comprising:
   a digital broadcast receiving unit for receiving broadcast data through a reference channel and at least one non-reference channel different from the reference channel, and extracting, from the received broadcast data, information on a starting time for reception of broadcast data of each channel;
   a timer for extracting, for the at least one non-reference channel, a time interval from the starting time for reception of the broadcast data of the reference channel to the starting time for reception of the broadcast data of the at least one non-reference channel; and
   a controller for controlling the digital broadcast receiving unit to extract the starting time information for the reception of the broadcast data of each channel, receiving the broadcast data of each channel according to the starting time information of the reference channel and the at least one non-reference channel, and storing the time intervals extracted by the timer as time offset values of the at least one non-reference channel.

2. The apparatus as claimed in claim 1, wherein, when a user has selected one of the non-reference channels for a channel change, the controller extracts starting time information for reception of broadcast data of the channel selected channel, by using starting time information of a currently-set reference channel and a time offset value of the channel selected by the user, and receives broadcast data of the selected channel by using the extracted starting time information.

3. The apparatus as claimed in claim 2, wherein, when the broadcast data of the channel selected by the user has been received, the controller sets the selected channel as the reference channel, and updates, time offset values of non-reference channels based on the currently-set reference channel.

4. The apparatus as claimed in claim 1, wherein the controller individually selects the at least one non-reference channel according to a sequence of channels, and extracts starting time information of the at least one non-reference channel following a sequence of the selected non-reference channels.

5. The apparatus as claimed in claim 4, wherein the digital broadcast receiving unit comprises:
   a starting time extraction module for determining whether broadcast data input through a radio frequency (RF) unit of the digital broadcasting reception terminal corresponds to either broadcast data of the reference channel or broadcast data of the selected at least one non-reference channel, and for extracting starting time information of a corresponding broadcasting channel from the broadcast data when the broadcast data corresponds to either broadcast data of the reference channel or broadcast data of a channel selected by the controller; and a channel selection module for receiving broadcast data at a time that corresponds with the starting time information of at least one channel, which has been applied by the controller.

6. The apparatus as claimed in claim 1, wherein the digital broadcasting reception terminal receives digital broadcast data based on a digital video broadcasting-handled (DVB-H) scheme.

7. The apparatus as claimed in claim 6, wherein the digital broadcast receiving unit includes a DVB-H Orthogonal Frequency Division Multiplexing (OFDM) demodulator, which receives broadcast data from the reference channel and at the least one non-reference channel, and extracts starting times point information from the received broadcast data.

8. A method for decreasing a channel change time in a digital broadcasting reception terminal which receives digital broadcast data based on a digital video broadcasting-handled (DVB-H) scheme, the method comprising the steps of:

setting a channel selected by a user as a reference channel, and extracting, from broadcast data received through the reference channel, starting time information on a start of reception of broadcast data of the reference channel;

extracting non-reference channel starting time information on a start of reception of broadcast data of at least one non-reference channel, the at least one non-reference channel being different from the reference channel, and then extracting time offset values for the at least one non-reference channel, which represent time intervals from the starting time of the reception of the broadcast data of the reference channel to the starting time of the reception of the broadcast data of the at least one non-reference channel;

determining whether the user has performed a channel change;

extracting starting time information of a channel selected through the channel change by using the reference-channel starting time information and a time offset value of the selected channel; and receiving broadcast data according to the starting time information of the selected channel, and setting the selected channel as the reference channel.

9. The method as claimed in claim 8, wherein extracting the time offset value further comprises:

selecting one of the at least one non-reference channel according to a sequence of channels, and extracting the selected-channel starting time information, which represents a start time for reception of broadcast data of the selected channel;

driving a timer included in the digital broadcasting reception terminal;

determining whether a current time corresponds to the start time for reception of broadcast data of the selected channel; and storing a time interval of the timer as a time offset value of the selected channel according to whether the current time corresponds to the start time for the reception of broadcast data of the selected channel.

10. The method as claimed in claim 9, wherein extracting the starting time information further comprises:

receiving broadcast data of the reference channel;

determining whether broadcast data received by the digital broadcasting reception terminal is broadcast data of the selected channel;

receiving broadcast data of the selected channel when the received broadcast data is the broadcast data of the selected channel; and extracting the selected-channel starting time information from the received broadcast data.

11. The method as claimed in claim 10, wherein the receiving of the broadcast data of the selected channel is limited to a minimal amount for extracting the selected-channel starting time information.

12. The method as claimed in claim 11, wherein only a header part of the broadcast data of the selected channel is received from the selected channel.

* * * * *